Dec. 12, 1933.                A. URFER                1,939,375
            MEANS FOR INDICATING ANGULAR MOVEMENTS
                    Filed June 12, 1931
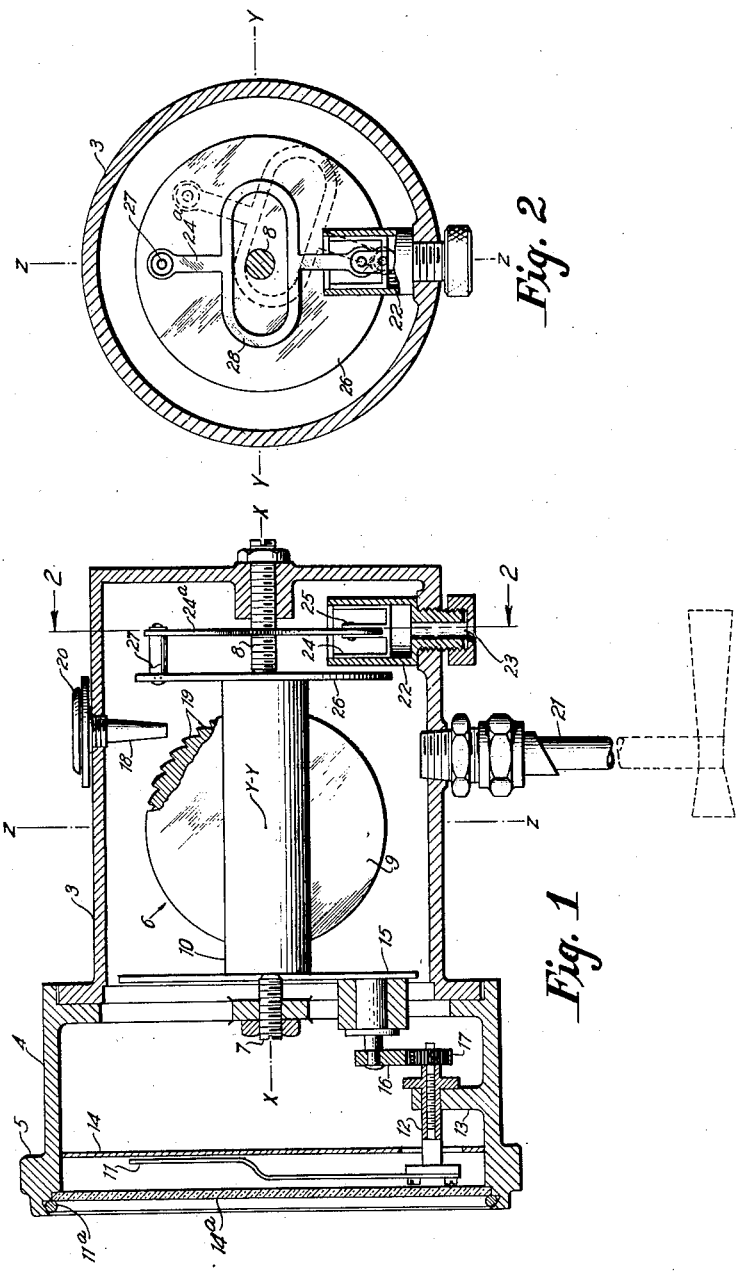
INVENTOR
Adolf Urfer
BY
F. B. Smith
  ATTORNEY Patented Dec. 12, 1933

1,939,375

UNITED STATES PATENT OFFICE 1,939,375

MEANS FOR INDICATING ANGULAR MOVEMENTS

Adolf Urfer, Richmond Hill, N. Y., assignor to Pioneer Instrument Company, Incorporated, Brooklyn, N. Y., a corporation of New York Application June 12, 1931. Serial No. 544,026

5 Claims. (Cl. 33—204)

The present invention relates to means for indicating angular movements of a mobile or dirigible object about one of its axes.

One of the objects of the invention is to provide novel means whereby the rate and magnitude of angular movement of a mobile or dirigible object may be indicated.

Another object is to provide novel indicating mechanism of the above type wherein the angular movement of the indicator or pointer is proportional to the rate of angular motion of the object carrying the mechanism.

A further object is to provide in an indicating mechanism of the above type employing precessional forces of a gyroscope, novel means whereby the gyroscope may be accurately centralized after precession and simultaneously damped to prevent oscillation thereof and to produce steady indication.

Another object is to provide in a turn indicating mechanism including a gyroscope having a rotor arranged to be driven by fluid pressure, novel means for centralizing the gyroscope after precession whereby a restoring force is applied to the gyroscope which is a function of the fluid pressure that drives the rotor.

Another object is to provide in a turn indicating mechanism including a gyroscope having a rotor arranged to be driven by fluid pressure, novel means for producing a restoring force on the gyroscope which opposes the precession of the latter and which is greater when the speed of the rotor increases due to an increase in the fluid pressure which drives the rotor and smaller when the speed of the rotor decreases due to a decrease in said fluid pressure.

Another object of the invention is to provide in a turn indicating mechanism employing a gyroscope, novel means whereby steady indications are produced when the gyroscope is operating and whereby fluctuating indications are produced when the gyroscope ceases to operate, thus indicating that the mechanism is inoperative.

Still another object is to provide in a turn indicating mechanism employing a gyroscope operated by the impact of a flow of fluid thereagainst, novel means of a pneumatic type for centralizing the gyroscope after precession and to simultaneously dampen the oscillations thereof in order to produce steady indications during operation and arranged to be operated from the same source of fluid which operates the gyroscope.

The above and other objects and advantages of the invention will appear more fully hereinafter from consideration of the detailed description which follows, together with the accompanying drawing wherein is illustrated one embodiment of the invention. It is to be expressly understood, however, that the drawing is for the purpose of illustration and description only and is not designed as a definition of the limits of the invention, reference being had for this purpose to the appended claims.

In the drawing, wherein like reference characters refer to like parts in the two views, Fig. 1 is a longitudinal sectional view illustrating one form of indicating means embodying the present invention; and Fig. 2 is a sectional end view taken on line 2—2 of Fig. 1.

Referring to the drawing, the indicating device embodying the invention is of the type including a gyroscope adapted to be rotated about an axis perpendicular to the axis about which the turning of the mobile or dirigible object, on which the device is mounted, is to be indicated, and adapted to precess about an axis perpendicular to both of the first mentioned axes, and means for indicating the precessional movements of the gyroscope which correspond to the angular movements and to the rate of such movements of the dirigible object.

In the form shown, the device comprises an airtight casing 3 which may be of any suitable material, as for example hard rubber or a phenolic condensation product, having an enlarged portion 4 which is provided with an annular flange 5 for suitable mounting on the control panel of the dirigible object, the angular motion of which is to be indicated so that the axis X—X will coincide with or lie parallel to the longitudinal axis of the object. The gyroscope 6 is mounted in any suitable manner within the casing as by means of the adjustable pivots or bearings 7 and 8 and includes a rotor 9 journaled in a frame 10 for rotation about the axis Y—Y so that the frame may oscillate about the axis X—X due to the precessional forces acting thereon when the frame and casing are turned about the axis Z—Z. The rotor and its supporting frame may be arranged in various other positions relative to the longitudinal axis of the casing and hence the axis of the dirigible object so that angular motion of the object about any one of its three axes may be indicated, as is well understood by those skilled in the art. The device embodying the present invention may be used on an aircraft, for example, to indicate the turn, bank or longitudinal inclination.

Means are provided for indicating the precessional movements of the gyroscope about the axis X—X and in the form shown, comprise a pointer 11 journaled in the enlarged portion 4 of the casing in any suitable manner as by means of the shaft 12 which is rotatably mounted in a projecting member 13 secured to or formed integral with the portion 4 of the casing and adapted to move relative to a fixed dial 14 carried by the casing. The dial and pointer may be viewed through a cover glass 14a which is secured in the casing by means of a retaining ring 11a. The precessional movements of the gyroscope frame 10 may be transmitted to the pointer 11 by means of a transmission mechanism including a plate 15 carried by the frame, a gear sector 16 mounted upon and rotatable with the plate 15, and a pinion 17 which is arranged to mesh with the gear sector 16 and carried by the shaft 12 to which is secured the pointer 11.

Means are provided for rotating the rotor 9 about the axis Y—Y and in the embodiment illustrated, comprise a nozzle 18 arranged to direct a fluid stream into the buckets 19 formed on the periphery of the rotor. The source of fluid may be introduced into the casing by means of the nozzle 18, the external end of which is covered, though not sealed, by a cap 20 and exhausted from the casing through an outlet pipe 21 secured to the opposite side of the casing. It is obvious that fluid under pressure for actuating the rotor may be derived in any suitable manner, as by connecting the outlet pipe 21 to a Venturi tube, to an exhaust pump, or to the intake manifold of the internal combustion engine of the vehicle on which the device is mounted, whereby the fluid may be drawn into the casing through the nozzle 18; or the nozzle may be connected to a compression pump to pump the fluid into the casing which may then be exhausted through the outlet pipe 21.

It is desirable that the gyroscope be returned to normal position after precessional movement thereof and to this end novel means are provided for centralizing the gyroscope frame 10 relative to the casing 3 about the axis X—X after the vehicle has made a turn. In the form shown, said means comprise a pneumatically operated device which is arranged in a parallel path with the exhaust pipe 21 so that it is actuated by the same source of fluid pressure as that which drives the gyro rotor but independently of the latter. The pneumatically operated device includes a cylinder 22 secured to or formed integral with the casing 3 and having an opening 23 which communicates with the atmosphere, and a piston 24 arranged to reciprocate within said cylinder and connected to the gyro-frame 10 by means of a connecting member 24a, one end of which is pivotally secured to the piston at 25 and the other end of which is pivotally secured to a circular plate 26 by means of a pin 27. A plate 26 is carried by and rotatable with the gyro-frame 10. The connecting member 24a is peculiarly shaped, as indicated in Fig. 2 of the drawing, and is provided with an intermediate portion 28 in the form of a chain-link through which the pivot 8 extends and which serves as a stop against said pivot to limit the movement of the gyro-frame in either direction, as indicated in the dotted lines in Fig. 2.

Normally, the pin 27, the pivot 8, and the piston 24 are in alignment along the diameter of the circular plate 26, which diameter lies parallel to the axis Z—Z and in a common plane therewith passing longitudinally through the casing. Upon precession of the gyro-frame 10 about the axis X—X, due to a turning of the dirigible object about the axis Z—Z, the connecting member 24a is imparted two motions, one of rotation about pivot 8 and one of translation, and the resultant motion causes the piston 24 to be moved downwardly into the cylinder 22. By virtue of the fact that cylinder 22 is in communication with the atmosphere by means of the opening 23, one side of the piston is at atmospheric pressure while the internal side is at a pressure less than atmospheric, due to the vacuum created within the casing by the exhaustion of the air therefrom through the pipe 21. This difference in pressure on the piston 24, which is produced by the same source of fluid that drives the gyro rotor, tends to move the piston upward and therefore, when the precessional forces of the gyroscope have ceased, the gyro-frame is returned to its initial centralized position by said pressure acting on the piston.

The cylinder 22 and the piston 24, in addition to their function of centralizing the gyroscope after precession, serve as a dashpot to dampen the oscillations of the gyro-frame due to vibration or any other causes, thereby eliminating a separate damping means and simplifying the construction of the indicating device. Should the supply of fluid be cut off for any reason, thereby rendering the gyroscope inoperative, then the centralizing force will also cease because of the fact that when the air is not being exhausted from the casing, the interior of the latter is at the same pressure as the exterior, and the pressure on both sides of the piston is the same so that the gyroscope frame 10 will be free to oscillate about the axis X—X to produce excessive oscillations or fluctuations of the pointer 11, thereby indicating that the device is inoperative.

It will be apparent from the foregoing that since the piston 24 of the centralizing mechanism is operated from the same source of fluid pressure that drives the rotor 9 of the gyroscope, the restoring force which opposes the precession of the gyroscope is a function of the fluid pressure and hence the speed of the rotor, that is, when the fluid pressure increases, the speed of the rotor increases thereby increasing the precessional force of the gyroscope but at the same time the differential pressure which operates the piston 24 also increases in the same proportion so that a greater opposing force is applied to the gyroscope when the precessional force of the latter is greater, and a smaller opposing force when the precessional force is smaller.

There is thus provided a novel device for indicating the rate as well as the magnitude of the angular movement of a mobile or dirigible object on which the device is mounted, and which is relatively simple in construction and positive in operation. While only one embodiment of the invention has been illustrated, other changes and modifications which will now appear to those skilled in the art, may be made without departing from the scope of the invention. Reference is therefore to be had to the appended claims for a definition of the limits of said invention.

What is claimed is:

1. In a device for indicating the angular motion of a mobile or dirigible object about one of its axes, the combination of an air-tight casing, a gyroscope pivotally mounted in said casing and arranged to precess in response to the angular motion of the object, means for introducing a fluid under pressure into said casing and directing it to drive the gyroscope, means for exhausting said fluid from said casing, fluid pressure responsive means arranged in parallel with the path of the exhausted fluid for producing a force opposing the precession of said gyroscope, means connected to said fluid pressure responsive means and to said gyroscope for applying said opposing force to the latter for returning it to normally centralized position, and means also connected to said gyroscope for indicating the rate and magnitude of precession of the latter in accordance with the rate and magnitude of the angular motion of the object on which the device is mounted, said fluid pressure responsive means being rendered inoperative upon a failure of the fluid pressure whereby the gyroscope is caused to oscillate about its axis of precession so that said indicating means is effective to indicate the inoperation of the device.

2. In a gyroscopic device, means for opposing the precession of the gyroscope element to centralize the latter about its axis of precession and comprising a cylinder, a piston movable in said cylinder, and means pivotally connecting said piston and said gyroscopic element for moving the former upon precession of the latter, said means including a circular plate carried by and rotatable with the frame of the gyroscopic element, and a connecting member having a portion in the form of a chain-link which serves as a stop for limiting the precession of the gyroscopic element in either direction.

3. In a gyroscopic turn indicator, a fluid pressure driven gyroscope arranged for precession about an axis, a pointer connected to said gyroscope and adapted to be actuated upon precession of the latter, and fluid pressure means for opposing the precession of said gyroscope to centralize the latter and for damping the oscillations thereof to produce steady indications of the pointer, said last named means including a cylinder, a piston movable in said cylinder, a plate carried by and rotatable with the gyroscope upon precession of the latter, and a connecting member pivotally connected to the piston and to the plate and having a portion in the form of a chain-link which serves as a stop for limiting the amount of precession of the gyroscope in either direction, said piston being arranged to be operated upon by the fluid pressure which drives the gyroscope, but independently of the latter, to produce a force opposing the precessional movement of the gyroscope and being rendered ineffective upon inoperation of the gyroscope due to a failure of the fluid pressure so that said gyroscope becomes unrestrained and unbalanced which causes undue oscillations of the pointer, thereby indicating that the turn indicator is inoperative.

4. In a device for indicating the angular motion of a mobile or dirigible object about one of its axes, the combination of an air-tight casing, a fluid pressure-driven gyroscope pivotally mounted in said casing for precession upon turning of the mobile object, means for admitting and exhausting a fluid from said casing to drive said gyroscope, means connected to said gyroscope for indicating the precession of the latter, and fluid pressure actuated means for producing a restoring force on the gyroscope for returning it to normally centralized position, said last named means comprising a cylinder having its one end in direct communication with the exterior of the casing and its other end extending into the interior of the casing and a piston movable in said cylinder having an air-tight fit therewith and pivotally connected to the gyroscope, whereby a force is created which opposes the precession of the gyroscope due to a differential pressure existing between the interior and exterior of the casing.

5. In a device for indicating the angular motion of a mobile or dirigible object about one of its axes, the combination of an air-tight casing, a fluid pressure driven gyroscope pivotally mounted in said casing for precession upon turning of the mobile object, means for admitting and exhausting a fluid from said casing to drive said gyroscope, means connected to said gyroscope for indicating the precession of the latter, and fluid pressure actuated means for producing a restoring force on the gyroscope for returning it to normally centralized position, said last named means comprising a cylinder secured to said casing with its longitudinal axis parallel to the path of the exhausted fluid and having its one end in direct communication with the exterior of the casing and its other end extending into the interior of the casing, and a piston movable in said cylinder and means in the form of a chain-link pivotally connecting said piston to the gyroscope and also serving as a stop to limit the precession of said gyroscope in either direction, said piston exerting an opposing force on the gyroscope due to a difference in pressure existing between the inside and outside faces of the piston.

ADOLF URFER.